United States Patent [19]

Inaba et al.

[11] Patent Number: 5,112,680

[45] Date of Patent: May 12, 1992

[54] MAGNETIC RECORDING MEDIUM

[75] Inventors: Hiroo Inaba; Takeshi Kakuta; Koichi Yamauchi; Akihiro Matsufuji, all of Kanagawa, Japan

[73] Assignee: Fuji Photo Film Co., Ltd., Kanagawa, Japan

[21] Appl. No.: 185,214

[22] Filed: Apr. 25, 1988

[30] Foreign Application Priority Data

Apr. 24, 1987 [JP] Japan .................................. 100144/87

[51] Int. Cl.$^5$ ........................................ G11B 23/00
[52] U.S. Cl. ................................ 428/329; 428/408; 428/694; 428/900
[58] Field of Search ................ 428/694, 329, 900, 332

[56] References Cited

U.S. PATENT DOCUMENTS

| | | | |
|---|---|---|---|
| 4,132,827 | 1/1979 | Mukaida et al. | 428/329 |
| 4,439,486 | 3/1984 | Yamada et al. | 428/332 |
| 4,594,174 | 6/1986 | Nakayama et al. | 428/900 |
| 4,600,521 | 7/1986 | Nakamura et al. | 428/694 |
| 4,613,545 | 9/1986 | Chubachi et al. | 428/900 |
| 4,690,863 | 9/1987 | Miyashi et al. | 428/900 |
| 4,707,410 | 11/1987 | Hata et al. | 428/694 |
| 4,784,907 | 11/1988 | Matsufuji et al. | 428/694 |
| 4,784,914 | 11/1988 | Matsufuji et al. | 428/694 |
| 4,788,103 | 11/1988 | Ohita et al. | 428/694 |
| 4,818,606 | 4/1989 | Koyama et al. | 428/408 |
| 4,830,923 | 5/1989 | Sumiya et al. | 428/694 |

Primary Examiner—Paul J. Thibodeau
Attorney, Agent, or Firm—Sughrue, Mion, Zinn, Macpeak & Seas

[57] ABSTRACT

A magnetic recording medium comprising a nonmagnetic support having provided thereon a magnetic layer comprising a ferromagnetic powder dispersed in a binder, wherein said ferromagnetic powder has a specific surface area of 40 m$^2$/g or more as measured by the BET method; said magnetic layer further comprises Al$_2$O$_3$ particles having an average particle diameter of from about 0.1 to 0.5 μm; and said binder comprises the combination of (1) a vinyl chloride resin containing a phosphate ester group represented by

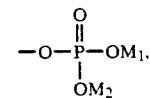

wherein M$_1$ and M$_2$, which may be the same or different, each represents Na, K, Li, H, N⊕R$_3$, or N⊕HR$_2$ wherein R represents an alkyl group or a hydrogen atom, and (2) at least one resin other than said vinyl chloride resin containing at least one of —SO$_3$M, —O-SO$_2$M, —COOM, and

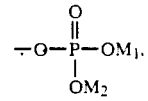

wherein M, M$_1$, and M$_2$, which may be the same or different, each represents Na, K, Li, H, N⊕R$_3$, or N⊕HR$_2$ wherein R represents an alkyl group or a hydrogen atom; provided that the weight ratio of said resin other than said vinyl chloride resin to said vinyl chloride resin is from about 0.4 to 2.5.

18 Claims, No Drawings

MAGNETIC RECORDING MEDIUM

FIELD OF THE INVENTION

The present invention relates to a magnetic recording medium and, more specifically, it relates to a magnetic recording medium which is excellent in the reduction of the friction coefficient at the surface of the magnetic layer and in the high frequency output, and in which deterioration of S/N (signal/noise) ratio is prevented.

BACKGROUND OF THE INVENTION

It has been attempted to increase the packing density of magnetic powder by introducing hydrophilic functional groups to a binder for use in a magnetic recording medium. Particularly, in the case of a vinyl chloride type resin, functional groups such as —OH and —COOH groups are introduced for increasing the packing density of the dispersing matters. However, if the vinyl chloride type resin alone is used as the binder, the performance of the medium is remarkably degraded in view of the running stability and the running durability because of its extremely poor flexibility. In view of the above, resins excellent in flexibility such as a polyurethane resin, a polyester resin, a phenoxy resin, an acrylonitrile rubber, etc. are used as the second ingredient for providing the magnetic recording medium with flexibility.

The above resins not containing functional groups have been used as the second ingredient. However, since still higher density has been required for magnetic recording media in recent years along with development in short wavelength recording systems, acidic groups (such as carboxylic, sulfonic, sulfate, and phosphate groups), amino groups, imino groups, imido groups, amido groups, hydroxy groups, alkoxy groups, thiol groups, halogen groups, silyl groups, etc. have now been included in the second ingredient. Thus, the packing density of the magnetic powder can be improved so as to be suitable for the short wavelength recording system.

However, if the dispersibility is increased excessively, the surface smoothness of the magnetic recording medium is also increased, and the drawback exists that the friction coefficient is undesirably increased. Accordingly, it is difficult at present to improve the dispersibility on one hand while suppressing the increase in the friction coefficient due to the mirror-smooth surface on the other hand.

Further, it has been intended to decrease the particle size of ferromagnetic powder used for the magnetic recording medium to permit short wavelength recording in recent years. In this circumstances, a problem such as reduction in the high frequency output and deterioration of the S/N ratio have been the result which are the problems encountered at present.

For reducing the friction coefficient, surface active lubricants, for example, fatty acids, fatty acid amides, fatty acid alcohols, fatty acid esters, or silicone oils, etc. have been used. Although the friction coefficient can be reduced to some extent by such means, it is not yet satisfactory for ensuring sufficient running performance and running durability. Further, if they are added in an excess amount, disadvantages such as head contamination occur due to exudation of the lubricants, and this can not be considered an effective means.

In increasing the density of magnetic recording media in recent years, their friction coefficient tends to be increased by making the magnetic particles finer, increasing the packing density, and providing a mirrorsmooth surface. However, both satisfactory running stability and satisfactory electromagnetic conversion properties are difficult to attain by the mere application of the surface active agents, carbon black, or inorganic powders. Further, there has been a great problem in recent years that the high frequency output and the S/N ratio of the magnetic medium running in a deck are deteriorated.

In order to avoid these problems, method have been proposed in which poler groups, such as a sulfonate group, a sulfate group, a carboxylate group, a phosphate group, etc., are introduced into the binder, but they are still insufficient in view of the electromagnetic conversion properties (as described in U.S. Pat. Nos. 4,529,661, 4,521,486, and 4,613,545).

The present inventors have made earnest studies on such problems and, as a result, have found that if the frictional resistance between the surface of the magnetic recording medium and the glass portion at the periphery of a magnetic head is high, destruction is caused at the surface of the glass portion by the high speed sliding contact of the medium and, as result, fine protrusions are formed on the glass surface and roughen the glass surface. It has been found that the fine protrusions grow together with the running time, which increase the spacing loss between the magnetic surface of the medium and the magnetic head to result in the reduction in the high frequency output and the S/N ratio. It has have also been found that this phenomenon is greatly influenced particularly by the grain size of the ferromagnetic powder and remarkably occurs in fine magnetic particles having a specific surface area of 40 $m^2$/g or more as measured by the BET method.

SUMMARY OF THE INVENTION

An object of the present invention is to provide a magnetic recording medium having satisfactory electromagnetic conversion characteristics and excellent running stability, and running durability, by combining a resin having hydrophilic functional groups with an alumina powder having an appropriate grain size.

Other objects of the present invention will be apparent from the following description.

The present inventors have studied the kind of functional groups of the resin and the powder added to the magnetic recording medium for overcoming the foregoing problems and, as a result, have found that both the increase in the density of the magnetic recording medium and the surface smoothness, and the reduction in the friction coefficient of the medium surface can be attained.

It has now been found that the above objects of the present invention can be attained by a magnetic recording medium comprising a nonmagnetic support having provided thereon a magnetic layer comprising a ferromagnetic powder dispersed in a binder, wherein the ferromagnetic powder has a specific surface area $S_{BET}$ of 40 $m^2$/g or more as measured by the BET method; the magnetic layer further comprises $Al_2O_3$ particles having an average particle diameter of from about 0.1 to 0.5 $\mu m$; and the binder comprises the combination of (1) (the first ingredient) a vinyl chloride resin containing a phosphate ester group represented by

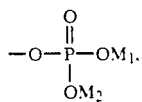

wherein $M_1$ and $M_2$, which may be the same or different, each represents Na, K, Li, H, $N\oplus R_3$, or $N\oplus HR_2$ wherein R represents an alkyl group or a hydrogen atom, and (2) (the second ingredient) at least one resin other than the vinyl chloride resin containing at least one of $-SO_3M$, $-OSO_2M$, $-COOM$, and

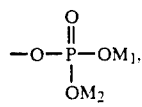

wherein M, $M_1$, and $M_2$, which may be the same or different, each represents Na, K, Li, H, $N\oplus R_3$, or $N\oplus HR_2$ wherein R represents an alkyl group or a hydrogen atom; provided that the weight ratio of the resin other than the vinyl chloride resin (the first ingredient) to the vinyl chloride resin (the second ingredient) is from about 0.4 to 2.5.

DETAILED DESCRIPTION OF THE INVENTION

The present invention is now described in more detail below.

According to the present invention, the vinyl chloride resin containing the phosphate ester group as the first ingredient is excellent in the dispersibility not only of the magnetic powder but also, particularly, of $Al_2O_3$, and the magnetic properties of the medium are not deteriorated if $Al_2O_3$ is added. Further, when the vinyl chloride resin containing the phosphate ester group is combined with the functional group-containing resin as the second ingredient and used together with $Al_2OH_3$ having a suitable grain size, the frictional resistance to the glass portion of the magnetic head can be reduced remarkably and, as a result, deterioration in the high frequency output and the S/N ratio after running as described above can be improved. This is demonstrated as is shown by examples described later by the actual measurement using a video tape and by measuring the friction coefficient with a glass rod.

The vinyl chloride resin containing the phosphate ester group used as the first ingredient in the present invention is prepared as a polymer or a copolymer of phosphate ester group-containing monomers.

Vinyl chloride units provide, in cooperation with other constituent units, an appropriate hardness and flexibility to the magnetic layer. Since the abrasion resistance of the magnetic recording medium becomes poor if the amount of vinyl chloride units is too small, whereas the solvent solubility tends to be reduced if it is excessive, the vinyl chloride content of the vinyl chloride resin is preferably from about 60 to 95 wt%, and more preferably from 80 to 95wt%.

The vinyl monomer containing the phosphate ester group in the present invention is a polymerizable vinyl monomer substituted with a phosphate ester group, and examples thereof include acid phosphoxy ethylacrylate, acid phosphoxy ethylmethacrylate, acid phosphoxy propylacrylate, acid phosphoxy propylmethacrylate, 3-chloro-2-acid phosphoxy propylacrylate, and 3-chloro-2-acid phosphoxy propylmethacrylate.

The phosphate ester group-containing vinyl monomer greatly contributes to the improvement of the dispersibility of the magnetic powder. If the amount of the phosphate group-containing monomer is too large, the solubility of the copolymer to solvents is lowered failing to obtain a uniform solution, the water resistance is deteriorated, and further, since side reactions other than the cross-linking reaction occurs with isocyanate compounds, the disadvantages exists that no cross linking effect for the improvement of the abrasion resistance can be obtained, and moreover the pot life of the magnetic coating composition is shortened. On the other hand, if the amount of the phosphate group-containing monomer is too small, the dispersibility of the magnetic powder tends to be deteriorated. Accordingly, the content of the phosphate group-containing monomer in the vinyl chloride resin is preferably from about 0.05 to 8%, and more preferably from 0.1 to 5% by weight.

The vinyl chloride resin containing phosphate group can be obtained by the known polymerization processes, for example, precipitation polymerization, solution polymerization, suspension polymerization, emulsion polymerization, etc. In the case of precipitation polymerization, methanol or n-hexane which provides good solubility for the vinyl monomer containing phosphate group, and in which the resultant polymer is insoluble, is preferably used as a polymerization solvent, and methanol is particularly preferred in view of the solvent solubility of the resulting copolymer and from an economic point of view. The vinyl chloride resin can be obtained as a fine powder in any of the solvents.

The polymerization degree of the vinyl chloride resin is preferably from about 150 to 600, more preferably from 200 to 450, in view of the mechanical strength and the adhesiveness of the magnetic layer and the characteristics of the magnetic coating composition for the magnetic layer. The resin having an average degree of polymerization of less than 150 is unsuitable since it provides only a weak coated surface when it is applied to a support, whereas the resin having a degree of polymerization of more than 600 increases the viscosity of the coating composition to reduce the workability upon coating.

The functional group-containing resin other than vinyl chloride as the second ingredient in the present invention can include, for example, an acrylate/acrylonitrile copolymer, an acrylate/vinylidene chloride copolymer, an acrylate/styrene copolymer, a methacrylate/acrylonitrile copolymer, a methacrylate/ vinylidene chloride copolymer, a methacrylate/styrene copolymer, a urethane elastomer, a nylon-silicone resin, a nitrocellulose-polyamide resin, a polyvinyl fluoride resin, a vinylidene chloride/acrylonitrile copolymer, a butadiene/acrylonitrile copolymer, a polyamide resin, a polyvinyl butyral, cellulose derivatives (cellulose acetate butyrate, cellulose diacetate, cellulose triacetate, cellulose propionate, nitrocellulose, etc.), a styrene/butadiene copolymer, a polyester resin, a chlorovinyl ether/acrylate copolymer, an amino resin, thermoplastic resins of various kind of synthetic rubbers and mixtures thereof. Among these, a urethane elastomer, a vinylidene chloride/acrylonitrile copolymer, a butadiene/acrylonitrile copolymer, cellulose derivatives, and a polyester resin are preferred, and a urethane elastomer, a butadiene/acrylonitrile copolymer, and a polyester resin are most preferred.

In the present invention, at least one of —SO₃M, —OSO₂M, —COOM, and

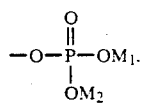

wherein M, M₁, and M₂, which may be the same or different, each represents Na, K, Li, H, N⊕R₃, or N⊕HR₂ wherein R represents an alkyl group or a hydrogen atom is contained in the non-vinyl chloride resin as the functional groups.

Acidic groups are preferred as the functional groups in view of the pot life and the functional groups described above are particularly excellent in view of the dispersibility.

In the present invention, the weight ratio of the second ingredient to the first ingredient is preferably from about 0.4 to 2.5, more preferably from 0.4 to 1.5, and most preferably from 0.4 to 1.0. If the ratio is less than about 0.4, the magnetic recording medium has an insufficient flexibility resulting in disadvantages such as dropping of powder in view of the running durability. On the other hand, if it exceeds about 2.5, the medium becomes too soft and causes running troubles such as adhesion.

The binder in the present invention may further contain other polymerizable monomers such as ethylene, propylene, vinyl acetate, etc. as a comonomer of the vinyl chloride resin, and the homopolymers or copolymers of these copolymerizable monomers may be used together with the first and second ingredients. In the case of these copolymerizable monomer is a comonomer of the vinyl chloride resin, the amount thereof is preferably from 1 to 20 wt% based on the amount of the vinyl chloride resin. In the case where the polymer or copolymer of these copolymerizable monomer is used, the amount of such polymer or copolymer is preferably from 0.5 to 25 wt% based on the total amount of the first and second ingredients. Particularly, use of ethylene as a comonomer unit for the vinyl chloride polymer is preferred in view of the improvement in the solvent solubility.

In the present invention, a polyisocyanate may preferably be used together with the first and second ingredients. The added amount thereof is preferably from 0.2 to 56.25 wt%, and more preferably from 0.25 to 56.25 wt% based on the total amount of the first and the second ingredients.

The polyisocyanate usable in the present invention can include isocyanates, for example, tolylene diisocyanate, 4,4'-diphenylmethane diisocyanate, hexamethylene diisocyanate, xylylene diisoicyanate, naphthylene-1,5-diisocyanate, o-tuluidine diisocyanate, isophorone diisocyanate, and triphenylmethane triisocyanate; reaction products of these isocyanates and polyalcohols; and polyisocyanates formed by the condensation of isocyanates. Among these compounds, tolylene diisocyanate, 4,4'-diphenylmethane diisocyanate, hexamethylene diisocyanate, and isophorone diisocyanate are preferably used in the present invention. These polyisocyanates are commercially available under the trade names of, for example, Collonate L, Collonate HL, Collonate 2,030, Collonate 2,031, Millionate MR, Millionate MTL (manufactured by Nippon Polyurethan Co.), Takenate D-102, Takenate D-110N, Takenate D-200, Takenate D-202 (manufactured by Takeda Yakuhin Co.), Desmodur L, Desmodur IL, Dismodur N, Dismodur HL (manufactured by Sumitomo Bayer Co.), etc., which may be used alone or in a combination of two or more of them utilizing the difference in curing reactivity. Further, a compound having a hydroxy group or an amino group may be used together to promote the curing reaction. It is desirable that these compounds are polyfunctional.

The ferromagnetic fine powder usable in the present invention can include known ferromagnetic fine powders such as $\gamma$—$Fe_2O_3$, Co-containing $\gamma$—$Fe_2O_3$, $Fe_3O_4$, Co-containing $Fe_3O_4$, $\gamma$—$FeO_x$, Co-containing $\gamma$—$FeO_x$ wherein $1.33 \leq X 1.50$, $CrO_2$, Co-Ni-P alloy, Co-Ni-Fe-B alloy, Fe-Ni Zn alloy, Ni-Co alloy, Co-Ni-Fe alloy, etc. Specifically, they are described, for example, in Japanese Patent Publication Nos. 14090/69, 18372/70, 22062/72, 22513/72, 28466/71, 38755/81, 4286/72, 12422/72, 17284/72, 18509/72, 18573/72, 10307/64, 29280/73, 39639/73, 29605/83, 44254/85, Japanese Patent Application (OPI) No. 126605/84, U.S. Pat. Nos. 3,026,215, 3,031,341, 3,100,194, 3,242,005, and 3,389,014. In addition, hexagonal tabular barium ferrite may also be used. The term "OPI" used herein means a published unexamined Japanese patent application.

It is a further feature of the present invention that the ferromagnetic powder has a specific surface area $S_{BET}$ of about 40 m²/g or more, preferably from 40 to 80 m²/g, as measured by the BET method.

The ratio of the amount of the ferromagnetic powder to the total amount of the magnetic layer at the dry state is preferably from 0.2 to 0.69 by weight, more preferably from 0.3 to 0.69 by weight.

Dispersants, lubricants, antistatic agent, etc. may be dissolved in the solvent and adsorbed on the surface of the ferromagnetic fine powder prior to the dispersion for the respective purposes described later.

In the present invention, the magnetic layer contains $Al_2O_3$ powder having an average grain size (particle diameter) from about 0.1 to 0.5 μm as an abrasive agent. The conventional magnetic recording medium generally contains a combination of 1 to 4 kinds of abrasive agents having Moh's hardness of 6 or more such as α-alumina, molten alumina, silicon carbide, chromium oxide, cerium oxide, corundum, artificial diamond, α-iron oxide, garnet, emery (mainly composed of corundum and magnetite), silica rock, silicon nitride, boron nitride, molybdenum carbide, boron carbide, tungsten carbide, titanium carbide, tripoli, diatomaceous earth, dolomite, etc. Among these inorganic powders, when $Al_2O_3$ powder having an average grain size of from about 0.1 to 0.5 μm is used in combination with the binder as described above, the advantage of remarkably reducing the friction coefficient and smoothing the sliding movement with the glass portion is obtained. If the average grain size is less than about 0.1 μm, the effect of reducing the friction coefficient is insufficient and, on the other hand, satisfactory electromagnetic conversion properties can not be maintained if it is more than about 0.5 μm. The $Al_2O_3$ powder is preferably added to the magnetic recording medium in an amount of from about 1 to 19 parts per 100 parts by weight of the ferromagnetic powder. The effect of the present invention can be attained if it is used in combination with other abrasive agents than $Al_2O_3$.

In the present invention, additives such as carbon black, a lubricant, a dispersant, an antistatic agent, etc. can further be incorporated into the magnetic layer.

In the present invention, carbon black can be incorporated into the magnetic layer and furnace carbon black for rubber, thermal carbon black for rubber, color carbon black, or acetylene carbon black can be used as the carbon black. Specific example of abbreviation of the carbon blacks in the U.S. include SAF, ISAF, IISAF, T, HAF, SPF, FF, FEF, HMF, GPF, APF, SRF, MPF, ECF, SCF, CF, FT, MT, HCC, HCF, MCF, LFF, RCF, etc. and those classified in ASTM Standard D-1765-82a can be used. The carbon black used in the present invention preferably has an average grain size of from about 5 to 1,000 m$\mu$ (as determined by an electron microscope), a specific surface area of from about 1 to 800 m$^2$/g determined by the nitrogen adsorption method, a pH value of from about 4 to 11 (according to JIS K-6221-1982), and a dibutylphthalate (DBP) oil adsorption amount of from 10 to 800 ml/100 g (according to JIS K-6221-1982). The grain size of the carbon black used in the present invention is preferably from 5 to 100 m$\mu$ for reducing the surface electric resistance of the coated film, and from 50 to 1,000 m$\mu$ for controlling the strength of the coated film. Further, the carbon black of fine particles (100 m$\mu$ or less) can be used for smoothing to reduce spacing loss, and carbon black of coarse grains (50 m$\mu$ or more) is used with an aim of roughening the surface to reduce the friction coefficient. Thus, the kind and the addition amount of the carbon black used are dependent on the purpose required for the magnetic recording medium.

Further, the carbon black may be used after the surface treating with the dispersant described later, or being grafted with resins. Further, these carbon blacks partially graphitized at the surface thereof by treatment at a temperature of 200° C. or more in a furnace upon producing carbon black may also be used. Furthermore, hollow carbon black may specially be used. It is preferred that the carbon black is used in an amount from about 0.1 to 20 parts by weight per 100 parts by weight of the fine ferromagnetic powder in the magnetic layer. Carbon blacks which can be used in the present invention are described in *Carbon Black Binran* (Manual for Carbon Black), edited by Carbon Black Association (1972).

The lubricant usable for the magnetic layer in the present invention can include, for example, silicone oil, graphite, molybdenum disulfide, boron nitride, graphite fluoride, fluorinated alcohol, polyolefin (e.g., polyethylene wax, etc.), polyglycol (e.g., polyethylene oxide wax, etc.), alkyl phosphate ester, polyphenyl ether, tungsten disulfide, a fatty acid ester formed of a monohydric fatty acid ester having from 10 to 20 carbon atoms and one or more of mono-valent, di-valent, trivalent, tetra-valent and hexa-valent alcohols having from 3 to 12 carbon atoms, and fatty acid esters formed of mono-basic fatty acids having from 10 or more carbon atoms and monovalent to hexa-valent alcohols having a number of carbon atoms providing the total number of carbon atoms of from 11 to 28. Fatty acids, fatty acid amides, and fatty acid alcohols each having from 8 to 22 carbon atoms may also be used. Specific examples of the organic compound lubricants include butyl caprylate, octyl caprylate, ethyl laurate, butyl laurate, octyl laurate, ethyl myristate, butyl myristate, octyl myristate, ethyl palmitate, butyl palmitate, octyl palmitate, ethyl stearate, butyl stearate, octyl stearate, amyl stearate, anhydrosorbitan monostearate, anhydrosorbitan distearate, anhydrosorbitan tristearate, anhydrosorbitan tetrastearate, oleyl oleate, oleyl alcohol, lauryl alcohol, etc.

As the lubricant for use in the present invention, conventional lubricant oil additives may also be used, and examples thereof include anti-oxidants (alkyl phenole, etc.), rust inhibitors (naphthenic acid, alkenyl succinic acid, dilauryl phosphate, etc.), oilly agents (rapeseed oil, lauryl alcohol, etc.), extreme pressure agents (dibenzyl sulfide, tricresyl phosphate, tributyl phosphite, etc.), cleaning dispersants, viscosity index improvers, flow point depressants, defoaming agents, etc. These lubricants are preferably added in an amount of from about 0.05 to 20 parts by weight per 100 parts by weight of the ferromagnetic powder. These agents are described e.g., in Japanese Patent Publication Nos. 238898/68, 4041/73, 18482/73, 18221/69, 28043/72, and 56132/82, U.S. Pat. Nos. 3,423,233, 3,470,021, 3,492,235, 3,497,411, 3,523,086, 3,625,760, 3,630,772, 3,634,253, 3,642,539, 3,687,725 and 4,135,031, and IBM Technical Disclosure Bulletin vol. 9, No. 7, p 779 (December 1966).

The dispersant usable in the present invention can include fatty acids having from 10 to 22 carbon atoms such as caprylic acid, capric acid, lauric acid, myristic acid, palmitic acid, stearic acid, oleic acid, elaidic acid, linoleic acid, linolenic acid, stearolic acid ($R_1COOH$ in which $R_1$ represents an alkyl group having from 9 to 21 carbon atoms), alkali metal soaps thereof (Li, Na, K, etc.) alkaline earth metal soaps thereof (Mg, Ca, Ba, etc.), Cu, Pb, etc. soaps of the fatty acids described above; lecithin, etc. In addition, higher alcohols having 4 or more carbon atoms, such as butanol, octanol, myristyl alcohol, stearyl alcohol, as well as sulfate esters and phosphate esters thereof may also be used. The dispersant is preferably added in an amount of from about 0.005 to 20 parts by weight per 100 parts by weight of the binder. The dispersant may be previously deposited on the surface of the fine ferromagnetic powder or the fine non-magnetic powder, or added during dispersing the coating composition. These agents are described, for example, in Japanese Patent Publication Nos. 28639/64, 17945/69, 18221/69, 39402/74, 15001/73, and U.S. Pat. Nos. 3,387,993 and 3,470,021.

The antistatic agent usable in the present invention can include, for example, an electroconductive powders such as graphite, carbon black, carbon black graft polymer; natural surface active agents such as saponin; nonionic surface active agents such as alkylene oxides, glycerins, glycidols, polybasic alcohols, polybasic alcohol esters, alkylphenol ethylene oxide addition products; cationic surface active agents such as higher alkyl amines, cyclic amines, hydantoin derivatives, amide amines, ester amides, quarternary ammonium salts, pyridine and other heterocyclic compounds, and phosphoniums or sulfoniums; anionic surface active agents containing acidic groups such as carboxylic, sulfonic phosphoric, sulfate, and phosphorate groups; amino acids; amphoteric surface active agents such as amino sulfonic acids, sulfuric acid or phosphoric acid esters of amino alcohols, and alkyl betaines. Examples of the surface active agent compound usable as the antistatic agents are disclosed, for example, in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, 3,545,974, West German Patent Application (OLS) No. 1,942,665, British Patents 1,077,317 and 1,198,450, as well as Ryohei Oda, Kaimennkasseizai no Gosei to sono Oyo (Synthesis and Application of Surface Active Agent), (Maki Shoten 1972); A. W. Baily *Surface Active Agents* (Inter Science Publication Corporated 1985); *Encyclopedia of Surface Active Agents*, vol. 2, (Chemical Publishing Company 1964); Kaimenkasseizai Binran (Surface Active Agent Manual), (6th edition, Sagyo Tosho Co., Dec. 20, 1966); and Hideo Marushige, *Taiden Boshizai* (Antistatic Agent) (Miyuki Shobo 1968), etc.

These surface active agents may be added alone or in combination. The amount of the surface active agent used in the magnetic recording medium of the present invention is preferably from about 0.01 to 10 parts by weight per 100 parts by weight of the fine ferromagnetic powder. These agents are used as an antistatic agent, but may often be used for other purposes, for example, improvement in dispersibility, magnetic properties, and lubricating properties, and as coating assistants. These agents are described, for example, in Elektronik, Vol. 9 No. 7, page 779 (1961); ibid No. 12, page 380 (1961); Kagaku Binran (Manual of Chemistry), application section, pages 954 to 967, (Maruzen Co. 1980).

The organic solvent used in the present invention, used for dispersing, kneading, and coating, can include ketones such as acetone, methyl ethyl ketone, methyl isobutyl ketone, cyclohexanone, and isophorone; alcohols such as methanol, ethanol, propanol, butanol, isobutanol, isopropanol, and methyl cyclohexanol; esters such as methyl acetate, ethyl acetate, butyl acetate, isobutyl acetate, isopropyl acetate, and ethyl lactate glycol monoethylether acetate; ethers such as diethyl ether, tetrahydrofuran, glycol dimethyl ether, glycol monoethyl ether and dioxane; tar type aromatic hydrocarbons such as benzene, toluene, xylene, cresol, chlorobenzene, and styrene; chlorinated hydrocarbons such as methylene chloride, ethylene chloride, carbon tetrachloride, chloroform, ethylene chlorohydrin, and dichlorobenzene; N,N-dimethyl formaldehyde; and hexane.

There is no particular restriction in the present invention for the method of kneading and dispersing, and the order of adding each of the ingredients is not limited. The magnetic coating composition can be prepared by using a conventional kneader, for example, a 2-roll mill, a 3-roll mill, a ball mill, a pebble mill, a tron mill sand grinder, a Szegvari attritor, a high speed impeller, a disperser, a high speed stone mill, a high speed impact mill, a disper, a kneader, a high speed mixer, a ribbon blender, a kneader, an intensive mixer, a tumbler, a blender, a disperser, a homogenizer, a single-axis screw extruder, a double-axis screw extruder, and a ultrasonic wave disperser. Details of the techniques of kneading and dispersing are described, for example, in T. C. Patton Paint Flow and Pigment Dispersion (John Wiley & Sons 1964), Kogyo Zairyo (Industrial Material) Vol. 25, 37 (1977) by Shinichi Tanaka, and publications cited therein. They are further described in U.S. Pat. Nos. 2,581,414 and 2,855,156. In the present invention, the magnetic coating composition can be prepared by kneading and dispersing in accordance with the methods as described in these publications.

The magnetic recording layer may be formed by optionally selecting the ingredients as described above, dissolving and dispersing them in an organic solvent, and coating as a coating composition on a support followed by drying. The dry thickness of the magnetic layer is preferably from about 1.5 to 7.0 $\mu$m, and more preferably from 3.0 to 6.0 $\mu$m. In the case of preparing a magnetic tape, it is preferred that the thickness of the support is from about 2.5 to 100 $\mu$m, and preferably from about 3 to 70 $\mu$m. In the case of a disk or a card-like material, the thickness of the support is preferably from about 0.5 to 10 mm, and in the case of a drum, it may used in a cylindrical shape. As the material for the support, there can be used polyesters such as polyethylene terephthalate, polyethylene naphthalate; polyolefins such as polypropylene, cellulose derivatives such as cellulose triacetate and cellulose diacetate; vinyl resins such as polyvinyl chloride; other plastics such as polycarbonate, polyamide, polysulfone, etc. as well as metals such as aluminum and copper, and ceramics such as glass. These supports may be subjected to corona discharging treatment, plasma treatment, primer coating, heat treatment, dustremoving treatment, metal vapor deposition, and alkali treatment prior to the coating. These supports are described, for example, in West German Patent No., 3338854A, Japanese Patent Application (OPI) No. 116926/84, U.S. Pat. No. 4,388,368; and Sen'i to Kogyo (Fibers and Industry), vol. 31, pages 50 to 55, by Yukio Mitsuishi (1975).

As the method of coating the coating composition the magnetic recording layer onto the support, there can be used air doctor coating, blade coating, air knife coating, squeeze coating, dip coating, reverse roll coating, transfer roll coating, gravure coating, kiss coating, cast coating, and spray coating, as well as other methods. These methods are specifically described e.g., in *Coating Kogaku* (Coating Technology), pages 253 to 277 (Asakura Shoten, Mar. 20, 1971).

After the magnetic layer is coated on a support by such a method, the magnetic powder in the layer is magnetically oriented by a conventional method as required while drying, and then the formed magnetic layer is dried. The conveying speed for the support in this case is usually from about 10 to 900 m/min and the drying temperature is usually controlled to from about 20° to 30° C.

The magnetic recording medium according to the present invention is prepared by further applying surface smoothing techniques or cutting into a desired shape as required. These processes are described, for example, in Japanese Patent Publication 23635/65 and 28368/64, and U.S. Pat. No. 3,473,960. Further, the methods described in Japanese Patent Publication 13181/67 which is a fundamental and important techniques in the relevant field of art can also be applied to the present invention.

The fine ferromagnetic powder, the non-magnetic powder, the binders, the additives, the solvents, and the supports, (optionally including a primer layer, a backing layer, a backing primer layer) and the production processes for the magnetic recording medium described in Japanese Patent Publication No. 26890/81 can be applied to the present invention.

The present invention will now be described in more detail with reference to specific example, but the present invention is not to be construed as being limited thereto. Unless otherwise indicated, all parts, percents, and ratios are by weight.

EXAMPLES 1 AND 2 AND COMPARATIVE EXAMPLES 1 TO 8

Each of the example composition was prepared as follows.

After charging a portion of the composition described below into a ball mill followed by sufficiently kneading, the remaining portion of the composition was charged in the ball mill and sufficiently kneaded. Then, 15 parts of Desmodur L75 (trade name of polyisocyanate compound, manufactured by Bayer Co.) were added thereto and uniformly mixed and dispersed to prepare a magnetic coating composition.

| | |
|---|---|
| Co-containing γ-Fe$_2$O$_3$ powder | 100 parts |
| Vinyl chloride resin (fist ingredient) | 10 parts |
| Non-vinyl chloride resin (second ingredient) | 10 parts |
| Al$_2$O$_3$ powder | 5 parts |
| Carbon black | 5 parts |
| Lecithin | 1 part |
| Oleic acid | 1 part |
| Octyl laurate | 1.5 parts |
| Butyl acetate | 200 parts |
| Methyl ethyl ketone | 100 parts |

In Example and Comparative Examples, the kind of Co-containing γ—Fe$_2$O$_3$ powder, vinyl chloride resin, resin other than vinyl chloride (non-vinyl chloride resin), and Al$_2$O$_3$ powder in the composition were varied as follows.

EXAMPLE 1

Co-containing γ—Fe$_2$O$_3$ powder
  Specific service area (BET method): 45 m$^2$/g
  Coersive force Hc: 880 Oe
Vinyl chloride-vinyl acetate copolymer containing phosphate ester groups
  Functional group content: $6.5 \times 10^{-5}$ eq/g
  Number average molecular weight: 16,000
  Polymerization degree: 380
Carboxyl-containing polyurethane (TiM-3005, manufactured by Sanyo Kasei Co.)
  Functional group content: $1 \times 10^{-5}$ eq/g
  Number average molecular weight: 22,000
Al$_2$O$_3$ powder
  Average grain size: 0.2 μm

EXAMPLE 2

Co-containing γ—Fe$_2$O$_3$ powder
  Specific service area (BET method): 45 mμ/g
  Coersive force Hc: 880 Oe
Vinyl chloride-vinyl acetate copolymer containing phosphate ester group (same as in Example 1)
Sulfonic group-containing polyurethane (UR-8300, manufactured by Toyo Boseki Co.)
  Number average molecular weight: 25,000
  Functional group content: $3.4 \times 10^{-5}$ eq/g
Al$_2$O$_3$ powder
  Average grain size: 0.2 μm

EXAMPLE 8

Co-containing γ-Fe$_2$O$_3$ powder
  Specific service area (BET method): 45 m$^2$/g
  Coersive force Hc: 880 Oe
Vinyl chloride-vinyl acetate copolymer containing phosphate ester group
  (same as in Example 1)
Carboxyl group-containing polyurethane (TiM-3005, manufactured by Sanyo Kasei Co.)
  (same as in Example 1)
Cr$_2$O$_3$ powder
  Average grain size: 0.5 μm

COMPARATIVE EXAMPLE 1

Co-containing γ—Fe$_2$O$_3$ powder
  Specific service area (BET method): 45 m$^2$/g
  Coersive force Hc: 880 Oe
Vinyl chloride-vinyl acetate copolymer containing carboxyl group (400×110A, manufactured by Nippon Zeon Co.)
  Functional group content: $1 \times 10^{-3}$ eq/g
  Number average molecular weight: 15,000
  Polymerization degree: 420
Polyurethane (N-2304, manufactured by Nippon Polyurethane Co.)
  Functional group content: none
  Number average molecular weight: 34,000
Al$_2$O$_3$ powder
  Average grain size: 0.2 μm

COMPARATIVE EXAMPLE 2

Co-containing γ—Fe$_2$O$_3$ powder
  Specific service area (BET method): 35 m$^2$/g
  Coersive force Hc: 880 Oe
Vinyl chloride-vinyl acetate copolymer containing carboxyl group (400×110A, manufactured by Nippon Zeon Co.)
  (same as in Comparative Example 1)
Polyurethane (N-2304, manufactured by Nippon Polyurethane Co.)
  (same as in Comparative Example 1)
Al$_2$O$_3$ powder
  Average grain size: 0.2 μm

COMPARATIVE EXAMPLE 3

Co-containing γ—Fe$_2$O$_3$ powder
  Specific service area (BET method): 30 m$^2$/g
  Coersive force Hc: 880 Oe
Vinyl chloride-vinyl acetate copolymer containing carboxyl group (400×110A, manufactured by Nippon Zeon Co.)
  (same as in Comparative Example 1)
Polyurethane (N-2304, manufactured by Nippon Polyurethane Co.)
  (same as in Comparative Example 1)
Al$_2$O$_3$ powder
  Average grain size: 0.2 μm

COMPARATIVE EXAMPLE 4

Co-containing γ—Fe$_2$O$_3$ powder
  Specific service area (BET method): 45 m$^2$/g
  Coersive force Hc: 880 Oe
Vinyl chloride-vinyl acetate copolymer containing phosphate ester group
  (same as in Example 1)
Polyurethane (N-2304, manufactured by Nippon Polyurethane Co.)
  (same as in Comparative Example 1)
Al$_2$O$_3$ powder
  Average grain size: 0.2 μm

COMPARATIVE EXAMPLE 5

Co-containing —Fe$_2$O$_3$ powder
  Specific service area (BET method): 30 m$^2$/g
  Coersive force Hc: 880 Oe
Vinyl chloride-vinyl acetate copolymer containing phosphate ester group
  (same as in Example 1)
Carboxyl group-containing polyurethane (TiM-3005, manufactured by Sanyo Kasei Co.)

(same as in Example 1)
Al₂O₃ powder
  Average grain size: 0.2 μm

COMPARATIVE EXAMPLE 6

Co-containing γ—Fe₂O₃ powder
  Specific service area (BET method): 45 mμ/g
  Coersive force Hc: 880 Oe
Vinyl chloride-vinyl acetate copolymer containing
  phosphate ester group
  (same as in Example 1)
Carboxyl group-containing polyurethane
(TiM-3005, manufactured by Sanyo Kasei Co.)
  (same as in Example 1)
Al₂O₃ powder
  Average grain size: 0.06 μm

COMPARATIVE EXAMPLE 7

Co-containing γ—Fe₂O₃ powder
  Specific service area (BET method): 45 m²/g
  Coersive force Hc: 880 Oe
Vinyl chloride-vinyl acetate copolymer
containing phosphate ester group
(same as in Example 1)
Carboxyl group-containing polyurethane (TiM-3005,
  manufactured by Sanyo Kasei Co.)
  (same as in Example 1)
Al₂O₃ powder
  Average grain size: 0.7 μm In Examples and Comparative Examples, the electromagnetic conversion characteristics on a VHS deck and the friction coefficients to glass and stainless steel were measured by the following procedures.

Video S/N

The difference between the S/N ratio of the sample tape and that of "Super AGT 120" manufactured by Fuji Photographic Film Co. as the standard tape was determined by using a noise meter (925C) manufactured by Shibasoku. The noise level was measured with a high pass filter at 10KHz and low pass filter at 4MHz. The VTR used was "NV-8300" manufactured by Matsushita Co.

Video S/N degradation

The difference between the video S/N after one minute running on the above deck and that after one hour running on the above deck was measured.

Friction coefficient to a stainless steel pole

The sample video tape and a stainless steel pole were brought into contact under a tension of 50 g ($T_1$), and the tension ($T_2$) required for running the tape at a speed of 3.3 cm/sec under this condition was measured. The friction coefficient μ of the video tape which is shown in Table 1 was determined by the following formula:

$$\mu = 1/\pi \cdot \ln T_2/T_1$$

Friction coefficient to a glass pole

The friction coefficient to a glass pole was determined in the same manner as the friction coefficient to the stainless steel pole as described above.

The results of the measurement are shown in Table 1.

TABLE 1

| Sample No. | Video S/N ratio | Video S/N ratio degradation | Friction coefficient to stainless steel pole (μ) | Friction coefficient to glass pole (μ) |
|---|---|---|---|---|
| Example 1 | +3.5 (dB) | −0.4 (dB) | 0.25 | 0.20 |
| Example 2 | +3.3 | ±0 | 0.26 | 0.20 |
| Comparative Example 8 | +2.0 | −0.8 | 0.33 | 0.32 |
| Comparative Example 1 | +3.2 | −2.2 | 0.45 | 0.40 |
| Comparative Example 2 | +2.0 | −0.7 | 0.35 | 0.29 |
| Comparative Example 3 | +1.3 | ±0 | 0.27 | 0.20 |
| Comparative Example 4 | +2.6 | −0.3 | 0.27 | 0.22 |
| Comparative Example 5 | +2.4 | ±0 | 0.26 | 0.21 |
| Comparative Example 6 | +3.7 | −2.5 | 0.42 | 0.45 |
| Comparative Example 7 | +1.2 | −0.3 | 0.22 | 0.20 |

EXAMPLE 4

A magnetic coating composition having the formulation shown below was prepared and coated on a nonmagnetic support made of polyethylene terephthalate having a 10 μm thickness in the same manner as in Example 1 so that the thickness of the magnetic layer after drying was 3.0 μm.

| | |
|---|---|
| Ferromagnetic Fe—Ni alloy powder | 100 parts |
| Ni content: about 5 wt % | |
| specific surface area | |
| determined by BET method: 45 m²/g | |
| Vinylchloride-vinylactate copolymler | 10 parts |
| containing phosphate ester group | |
| (same as in Example 1) | |
| Sulfonic group-containing polyurethane | 8 parts |
| (UR-8300, manufactured by Toyo Boseki) | |
| (same as in Example 2) | |
| Carbon black (Vulcan XC-72, | 1 part |
| manufactured by Cabot Co.) | |
| grain size: 32 mμ | |
| Al₂O₃ powder (Average grain size: 0.2 μm) | 8 parts |
| Oleic acid | 0.5 parts |
| Myristic acid | 1.5 parts |
| Octyl laurate | 3 parts |
| Methyl ethyl ketone | 200 parts |

-continued

| Polyisocyanate (Collonate L. manufactured by Nippon Polyurethan) | 10 parts |

Magnetic field orientation was applied to the non-magnetic support coated with the magnetic coating composition when the coating composition was not yet dried, and after drying and calendering to the surface, it was slit to 8 mm widths to prepare a 8 mm video tape.

COMPARATIVE EXAMPLE 9

A tape was prepared in the same manner as in Example 4 except for replacing the vinylchloridevinyl acetate copolymer containing phosphoric acid ester group with a vinylchloride-vinyl acetate copolymer containing carboxyl group (VMCH, manufactured by Union Carbide Co., number average molecular weight: 21,000, polymerization degree: 340, functional group (—COOH) content : $9.5 \times 10^{-5}$ eq/g).

The sample tapes obtained in Example 4 and Comparative Example 9 were tested as follows.

Video S/N

The difference between the S/N ratio of the sample tape and that of "Super AGP 6 90" manufactured by Fuji Photographic Film Co. as the standard tape was determined by using a noise meter (925C) manufactured by Shibasoku. The noise level was measured with a high pass filter at 10KHz and low pass filter at 4MHz. The VTR used was "FUJIX Z 600AF" manufactured by Fuji Photo Film Co., Ltd.

Video S/N degradation

The difference between the video S/N ratio of the initial first pass and that after 10 times pass running was measured.

Friction coefficient to stainless steel and glass poles

The sample video tape and each of a stainless steel pole and a glass pole were brought into contact under a tension of 20 g ($T_1$), and the tension ($T_2$) required for running the tape at a speed of 1.4 cm/sec under this condition was measured. The friction coefficient of the video tape was determined by the following formula:

$$\mu = 1/\pi \cdot \ln T_2/T_1$$

The results of the evaluation for the 8 mm video tapes prepared in Example 4 and Comparative Example 9 are shown in Table 2.

TABLE 2

| Sample No. | Video S/N ratio | Video S/N ratio degradation | Friction coefficient to stainless Steel pole | Friction coefficient to glass pole |
|---|---|---|---|---|
| Example 4 | +0.5 dB | −0.6 dB | 0.23 | 0.25 |
| Comparative Example 9 | −0.5 dB | −3.5 dB | 0.27 | 0.39 |

Apparent from the results shown in Tables 1 and 2, it is possible according to the invention to obtain a magnetic recording medium having satisfactory electromagnetic conversion characteristics, with no deterioration in the high frequency output and the S/N ratio, and excellent in running stability.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a non-magnetic support having provided thereon a magnetic layer comprising a ferromagnetic powder dispersed in a binder, wherein said ferromagnetic powder has a specific surface area of 40 m²/g or more as measured by the BET method; said magnetic layer further comprising $Al_2O_3$ particles having an average particle diameter of from about 0.1 to 0.5 μm; and said binder comprising the combination of (1) a vinyl chloride resin containing a phosphate ester group represented by

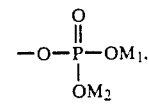

wherein $M_1$ and $M_2$, which may be the same or different, each represents Na, K, Li, H, N⊕$R_3$, or N⊕H$R_2$ wherein R represents an alkyl group or a hydrogen atom, and (2) at least one resin other than said vinyl chloride resin containing at least one of —$SO_3M$, —O-$SO_2M$, —COOM, and

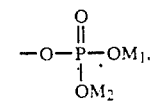

wherein M, $M_1$, and $M_2$, which may be the same or different, each represents Na, K, Li, H, N⊕$R_3$, or N⊕H$R_2$ wherein R represents an alkyl group or a hydrogen atom; provided that the weight ratio of said resin other than said vinyl chloride resin to said vinyl chloride resin is from about 0.4 to 2.5.

2. A magnetic recording medium as claimed in claim 1, wherein the vinyl chloride content of said vinyl chloride resin is from about 60 to 95 wt%.

3. A magnetic recording medium as claimed in claim 2, wherein the vinyl chloride content of said vinyl chloride resin is from 80 to 95 wt%.

4. A magnetic recording medium as claimed in claim 1, wherein the content of the phosphate group-containing monomer in said vinyl chloride resin is from about 0.05 to 8% by weight.

5. A magnetic recording medium as claimed in claim 4, wherein the content of the phosphate group-containing monomer in said vinyl chloride resin is from 0.1 to 5% by weight.

6. A magnetic recording medium as claimed in claim 1, wherein said vinyl chloride resin has a degree of polymerization of from about 150 to 600.

7. A magnetic recording medium as claimed in claim 6, wherein said vinyl chloride resin has a degree of polymerization of from 200 to 450.

8. A magnetic recording medium as claimed in claim 1, wherein the weight ratio of said resin other than said vinyl chloride resin to said vinyl chloride resin is from about 0.4 to 1.5.

9. A magnetic recording medium as claimed in claim 8, wherein the weight ratio of said resin other than said vinyl chloride resin to said vinyl chloride resin is from 0.4 to 1.0.

10. A magnetic recording medium as claimed in claim 1, wherein said binder further comprises an isocyanate.

11. A magnetic recording medium as claimed in claim 1, wherein said magnetic layer comprises from about 1 to 19 parts by weight of said $Al_2O_3$ particles per 100 parts by weight of said ferromagnetic powder.

12. A magnetic recording medium as claimed in claim 1, wherein said ferromagnetic powder has a specific surface area of from 40 to 80 m$^2$/g as measured by the BET method.

13. A magnetic recording medium as claimed in claim 1, wherein the weight ratio of the amount of said ferromagnetic powder to the total amount of said magnetic layer is from 0.2 to 0.69.

14. A magnetic recording medium as claimed in claim 13, wherein the weight ratio of the amount of said ferromagnetic powder to the total amount of said magnetic layer is from 0.3 to 0.69.

15. A magnetic recording medium as claimed in claim 1, wherein said ferromagnetic powder is Co-containing 8—$Fe_2O_3$ powder having a specific surface area $S_{BET}$ of about from 40 to 80 m$^2$/g as measured by the BET method.

16. A magnetic recording medium as claimed in claim 15, wherein said ferromagnetic powder is Co-containing 8—$Fe_2O_3$ powder having a specific surface area $S_{BET}$ of about from 45 to 80 m$^2$/g as measured by the BET method.

17. A magnetic recording medium as claimed in claim 1, wherein said magnetic layer further comprises carbon black having a primary particle size of from 20 to 120 μm in an amount of from 0.1 to 15 parts by weight per 100 parts by weight of said ferromagnetic powder.

18. A magnetic recording medium as claimed in claim 17, wherein said carbon black has a primary particle size of from 20 to 120 μm in an amount of from 0.5 to 12 parts by weight per 100 parts by weight of said ferromagnetic powder.

* * * * *

UNITED STATES PATENT AND TRADEMARK OFFICE
CERTIFICATE OF CORRECTION

PATENT NO.    : 5,112,680
DATED         : May 12, 1992
INVENTOR(S)   : Hiroo INABA et al.

It is certified that error appears in the above-identified patent and that said Letters Patent is hereby corrected as shown below:

Claim 15, line 2, change "$8\text{-}Fe_2O_3$" to -- $\gamma\text{-}Fe_2O_3$ --; and Claim 16, line 2, change "$8\text{-}Fe_2O_3$" to -- $\gamma\text{-}Fe_2O_3$ --.

Signed and Sealed this

Twelfth Day of October, 1993

Attest:

BRUCE LEHMAN

Attesting Officer

Commissioner of Patents and Trademarks